United States Patent
Nishimura et al.

(10) Patent No.: US 7,960,672 B2
(45) Date of Patent: Jun. 14, 2011

(54) ROBOT WELDING CONTROLLER AND CONTROL METHOD

(75) Inventors: Kiminori Nishimura, Fukuoka (JP); Ryuichi Morita, Fukuoka (JP); Seigo Nishikawa, Fukuoka (JP)

(73) Assignee: Kabushiki Yaskawa Denki, Fukuoka (JP)

( * ) Notice: Subject to any disclaimer, the term of this patent is extended or adjusted under 35 U.S.C. 154(b) by 1134 days.

(21) Appl. No.: 11/628,738

(22) PCT Filed: May 23, 2005

(86) PCT No.: PCT/JP2005/009374
§ 371 (c)(1),
(2), (4) Date: Mar. 6, 2007

(87) PCT Pub. No.: WO2005/120758
PCT Pub. Date: Dec. 22, 2005

(65) Prior Publication Data
US 2008/0041834 A1 Feb. 21, 2008

(30) Foreign Application Priority Data
Jun. 8, 2004 (JP) .................................. 2004-170011

(51) Int. Cl.
*B23K 9/10* (2006.01)
*B23K 9/12* (2006.01)
(52) U.S. Cl. ............. 219/125.1; 219/130.21; 219/130.5; 219/130.51; 219/137.7
(58) Field of Classification Search ................ 219/125.1, 219/130.5, 130.51, 137.7, 130.21; 901/42
See application file for complete search history.

(56) References Cited

U.S. PATENT DOCUMENTS

| | | | | |
|---|---|---|---|---|
| 4,560,857 A * | 12/1985 | Segawa et al. | ........... | 219/130.21 |
| 6,207,928 B1 * | 3/2001 | Kawamoto et al. | ...... | 219/130.51 |
| 6,534,746 B1 * | 3/2003 | Yamamoto et al. | ...... | 219/137 PS |
| 2004/0074885 A1 * | 4/2004 | Takatani et al. | ............ | 219/130.5 |

FOREIGN PATENT DOCUMENTS

| | | | |
|---|---|---|---|
| JP | 03297564 A | * | 12/1991 |
| JP | 2000-670 A | | 1/2000 |
| JP | 2002-160059 A | | 6/2002 |
| JP | 2002-205169 A | | 7/2002 |
| WO | WO 0103875 A1 | * | 1/2001 |
| WO | WO 02066194 A1 | * | 8/2002 |

OTHER PUBLICATIONS

JP 2002-160059 A—PAJ Machine assisted English translation.*

* cited by examiner

*Primary Examiner* — Stephen J Ralis
(74) *Attorney, Agent, or Firm* — Sughrue Mion, PLLC

(57) ABSTRACT

A robot welding controller and a robot welding control. It comprises a robot having a welding torch at its tip, a robot controller, a wire feeder, and a welding electric power. It performs welding by moving the welding torch on the basis of a commanded welding line. A contact detecting section detects contact of the wire and the base material. A feed direction switching section switches feed directions of the wire. An arc generation detecting section detects that an arc is generated between the wire and the base material. A waveform control section controls electric power waveforms of plural shapes applied between the wire and the base material. A welding sequence section controls the operations of the contact detecting section, the feed direction switching section, the arc generation detecting section and the waveform control section in block.

2 Claims, 4 Drawing Sheets

ROBOT WELDING CONTROLLER AND CONTROL METHOD

TECHNICAL FIELD

The present invention relates to a robot welding controller and a robot welding control method for operating a robot by using a consuming electrode and performing welding.

RELATED ART

A conventional welding control method (e.g., patent literature 1) will be explained by showing FIG. 7. A welding electric power source is started simultaneously when wire supply is started at a relatively low speed $S_0$ of about 3 m/min at time $t_0$. A no-load voltage $V_0$ is then applied to the wire. The wire comes in contact with a base material at time $t_1$, and electric conduction is started. However, when it is detected by an electric current value detector that a short circuit electric current $I_s$ is flowed to the wire at this time, a wire feed controller reversely rotates an unillustrated feed motor of a pull feeder at time $t_2$ passing by 3 ms from time $t_1$, and returns the wire from the base material 3 by about 3 mm at speed $S_B$. In this process, a tip of the wire is separated from the base material while the electric conduction is performed. A small spark is generated from the tip of the wire 2 and becomes an arc.

When the generation of the arc is detected from a change of a wire voltage $V_w$ and a wire electric current $I_w$, a wire feed speed is set to speed $S_w$ at a welding time from time $t_3$, and a steady welding state is started.

Patent literature 1: JP-A-2002-160059 (line 40 of left-hand column of page 4 to line 5 of right-hand column of page 4)

DISCLOSURE OF THE INVENTION

Problems to be Solved by the Invention

However, in the above-mentioned conventional robot controller, a problem exists in that the welding becomes unstable at an initial stage for starting the welding of the steady state after the arc generation.

The present invention is intended to solve such a problem caused in the conventional construction, and its object is to provide a robot welding controller and a robot welding control method for realizing welding of high quality by using a robot.

Means for Solving the Problems

According to claim 1, there is provided a robot welding controller for welding by moving a welding torch on the basis of a welding line commanded in advance including:
a robot having the welding torch at a tip thereof;
a robot controller for controlling the operation of the robot;
a wire feeder for feeding a wire to the welding torch;
a welding electric power source for supplying electric power between the wire and a base material;
a contact detecting section for detecting contact of the wire and the base material;
a feed direction switching section for switching feed directions of the wire;
an arc generation detecting section for detecting that an arc is generated between the wire and the base material;
a waveform control section for controlling electric power waveforms of plural shapes applied between the wire and the base material; and
a welding sequence section for controlling the operations of the contact detecting section, the feed direction switching section, the arc generation detecting section and the waveform control section in block.

According to claim 2, there is provided the robot welding controller, wherein
the electric power waveforms of the plural shapes include the waveform of a pulse shape.

According to claim 3, there is provided the robot welding controller, wherein
a parameter variable for controlling the electric power waveforms of the plural shapes is set from the robot controller.

According to claim 4, there is provided a robot welding control method for welding by moving a welding torch on the basis of a welding line commanded in advance with a robot including a welding torch at a tip thereof, a robot controller for controlling the operation of the robot, a wire feeder for feeding a wire to the welding torch, and a welding electric power source for supplying electric power between the wire and a base material,
the robot welding control method including:
a step for feeding the wire applying a voltage thereto;
a step for judging that the wire comes in contact with the base material;
a step for feeding the wire in a reverse direction;
a step for judging that an arc is generated between the wire and the base material;
a step for supplying electric power to the wire by a first waveform while the wire is fed in a normal direction; and
a step for supplying the electric power by a second waveform different from the first waveform after a predetermined time has passed.

According to claim 5, there is provided the robot welding controller, wherein
the first waveform is the waveform of a pulse shape.

According to claim 6, there is provided the robot welding controller, wherein
a parameter variable for controlling the first waveform and the second waveform is set from the robot controller.

Effect of the Invention

In accordance with the present invention, since the arc is reliably generated and can be then stabilized, it can rapidly proceed to a welding main condition.

Figure 1:
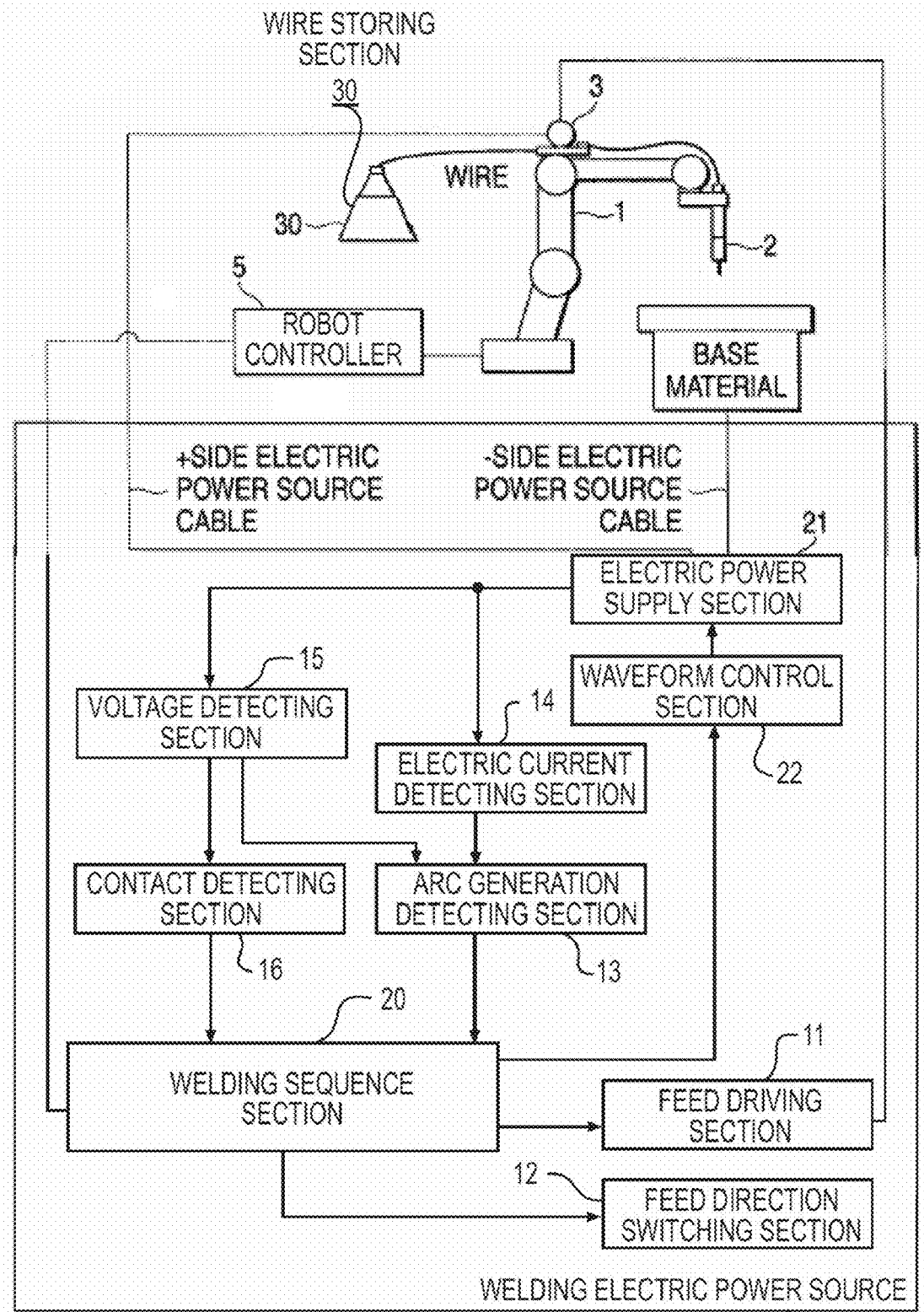
FIG. 1 is a system constructional view of the present invention.

DESCRIPTION OF THE REFERENCE NUMERALS AND SIGNS 1 robot
2 torch 3 wire feeder
5 robot controller
10 welding electric power source
11 feed driving section
12 feed direction switching section
13 arc generation detecting section
14 electric current detecting section
15 voltage detecting section
16 contact detecting section
20 welding sequence section
21 electric power supply section
22 waveform control section
30 wire storing section

BEST MODE FOR CARRYING OUT THE INVENTION

Embodiment modes of the present invention will next be explained on the basis of FIGS. 1 to 6.

Embodiment 1

A system constructional view of the present invention is shown in FIG. 1. A robot 1 is a multi-joint robot having a freedom degree of 6 or more, and is controlled by a robot controller 5. A wire feeder 3 is mounted onto an arm of the robot 1. Further, a torch 2 is attached to a tip portion of the robot 1. The wire feeder 3 has an electric motor for feeding a wire stored to a wire storing section 30 to a tip of the torch 2.

A welding electric power source 10 has a feed driving section 11 for controlling the operation of the electric motor of this wire feeder 3. Electric power of welding is supplied from an electric power supply section 21 within the welding electric power source 10. A waveform control section 22 controls a welding waveform outputted from the electric power supply section 21.

Further, the welding electric power source 10 has an electric current detecting section 14 and a voltage detecting section 15 for detecting an output state during welding. An arc generation detecting section 13 detects that an arc is generated on the basis of the electric current detecting section 14 and the voltage detecting section 15.

Figure 2:
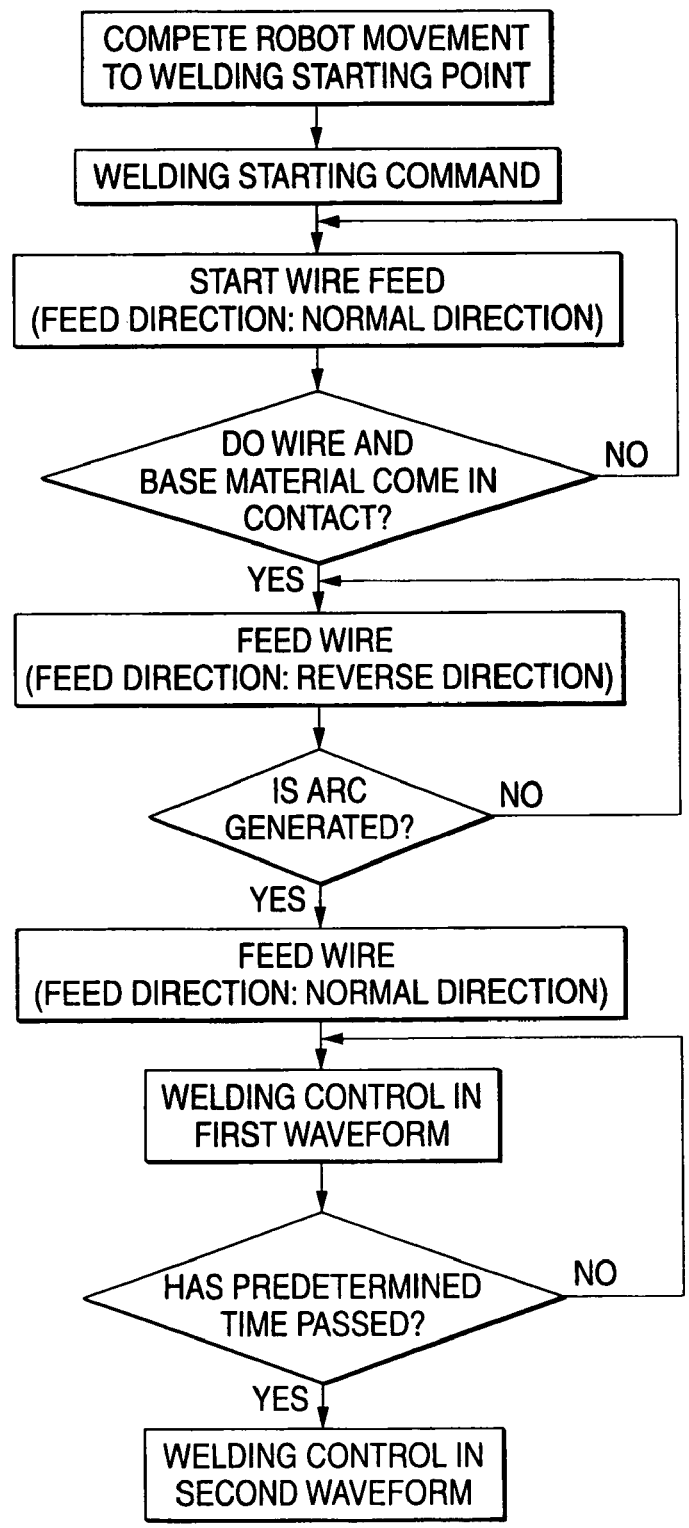
FIG. 2 is a flow chart of the present invention.

Subsequently, processing of a welding sequence section 20 is shown in detail on the basis of FIG. 2.

The robot 1 is moved to a welding starting point. Thereafter, a welding condition and a welding starting command are outputted from the robot controller 5 to the welding electric power source 10.

In the welding electric power source 10, the welding sequence section 20 executes polling processing with respect to the command from the robot controller 5. This polling period is shorter than a control period of the robot controller 5.

When the welding sequence section 20 recognizes the welding starting command from the robot controller 5 by the polling processing, a command is given to the feed driving section 11 so as to rotate the electric motor of the wire feeder 3 in a normal direction. At this time, a command is simultaneously given to the electric power supply section 21 so as to apply a predetermined voltage between the wire and a base material.

A contact detecting section 16 monitors an output voltage by the voltage detecting section 15 while the wire is fed and controlled in the normal direction. When the output voltage becomes a predetermined value or less, it is judged that the wire comes in contact with the base material, and the contact is notified to the welding sequence section 20. When the welding sequence section 20 receives the notification of the contact detection of the wire, the welding sequence section 20 gives a command to a feed direction switching section 12 so as to switch feed directions. The feed direction switching section 12 gives commands to the feed driving section 11 so as to once stop the wire feed and then feed the wire in the reverse direction. Thus, the wire is returned in a direction separated from the base material (in the reverse direction).

While the wire is returned in the direction separated from the base material, an output electric current is detected in the electric current detecting section 14. The arc generation detecting section 13 monitors the output electric current from the electric current detecting section 14, and judges that an arc is generated when the output electric current becomes a predetermined value or more. When the arc generation detecting section 13 judges that the arc is generated, the arc generation detecting section 13 notifies the arc generation to the welding sequence section 20.

The welding sequence section 20 gives a command to a waveform control section 22 so as to control welding by a first waveform. The waveform control section 22 receiving the command executes welding by the first waveform. When the welding sequence section 20 executes the welding of the first waveform for a predetermined time, the welding sequence section 20 gives a command to the waveform control section 22 so as to execute welding by a second waveform.

The first waveform and the second waveform are shown in FIGS. 3 to 6.

Figure 3:
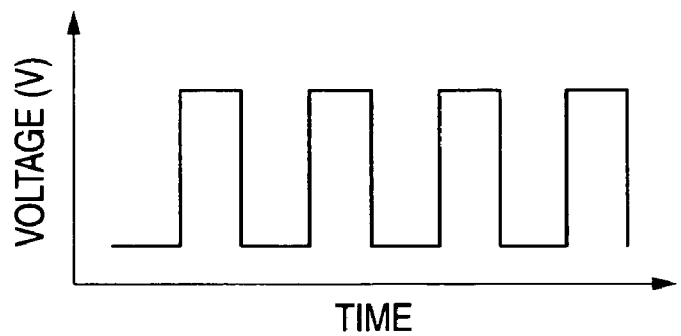
FIG. 3 is a view showing an output voltage waveform of a first waveform.
Figure 4:
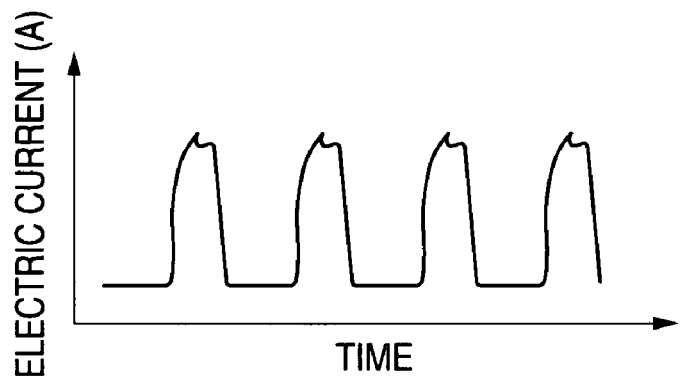
FIG. 4 is a view showing an output electric current waveform of the first waveform.
Figure 5:
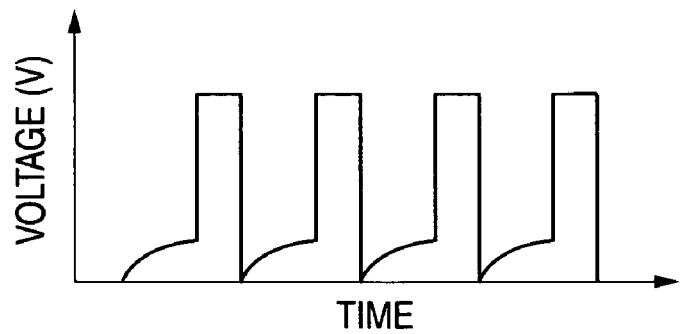
FIG. 5 is a view showing an output voltage waveform of a second waveform.
Figure 6:
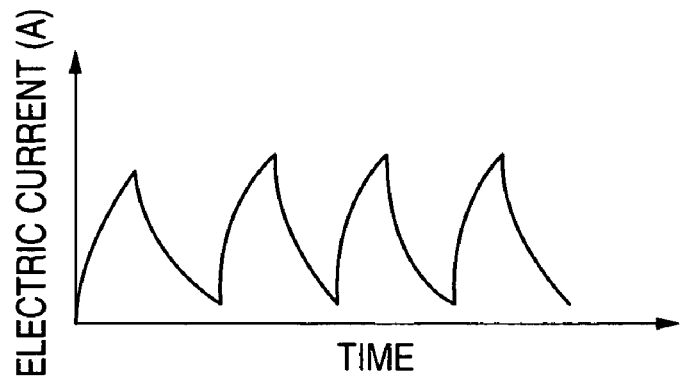
FIG. 6 is a view showing an output electric current waveform of the second waveform.
Figure 7:
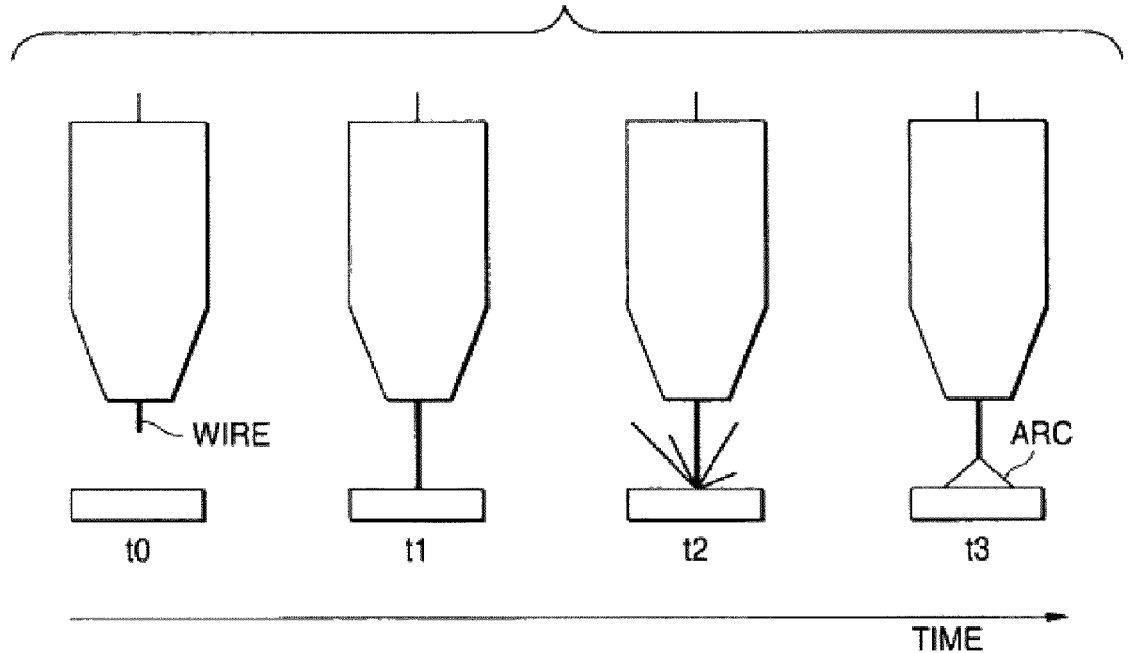
FIG. 7 is a view of the prior art.

FIG. 3 shows the waveform of an output voltage of the first waveform. FIG. 4 shows the waveform of an output electric current of the first waveform. FIG. 5 shows the waveform of an output voltage of the second waveform. FIG. 6 shows the waveform of an output electric current of the second waveform. As can be seen from these figures, the first waveform is a waveform normally called a pulse, and welding control is performed such that the output waveform becomes a waveform of a pulse shape. Further, the second waveform is a control waveform of short circuit welding.

After the arc generation, the first waveform is controlled so as to become a pulse waveform to stabilize welding for a predetermined time. When the wire is transferred to a melting droplet by the pulse waveform, the welding of a small spatter can be performed by controlling the size of this melting droplet.

Thus, if the welding waveform is controlled in a pulse shape during a constant time from an arc welding start, the arc can be reliably stabilized and a preferable arc start can be made. It can then rapidly proceed to a welding main condition by reliably making the arc start.

Further, if patterns of the first waveform and the second waveform are recognized by numbers, various welding waveforms at a welding starting time can be controlled by giving commands of the pattern numbers from the robot controller 5.

Further, in this embodiment, management is performed by passage time with respect to switching of each waveform. However, timing of the switching may be also made by various parameters such as average electric current value, voltage value, etc.

INDUSTRIAL APPLICABILITY

The present invention is useful in a robot welding controller and a robot welding control method for performing welding by using a consuming electrode.

The invention claimed is:
1. A robot welding controller for short-circuit-welding, the robot welding controller comprising:

a robot having a welding torch at a tip thereof;
a robot controller for controlling the robot;
a wire feeder for feeding a wire to the welding torch;
a welding electric power source for supplying an electric power between the wire and a base material;
a contact detecting section for detecting contact of the wire and the base material;
a feed direction switching section for switching feed directions of the wire;
an arc generation detecting section for detecting that an arc is generated between the wire and the base material;
a waveform control section
controlling electric power waveforms applied between the wire and the base material to be a first waveform constituted by plural pulses having a same shape or a second waveform having a short-circuit-welding waveform different from the first waveform; and
a welding sequence section
controlling the contact detecting section, the feed direction switching section, the arc generation detecting section and the waveform control section, making the wire feeder to feed the wire in a normal direction,
directing the feed direction switching section to switch the feeding direction in a reverse direction when the contract detecting section detects contact between the wire and the base material,
directing the feed direction switching section to switch the feeding direction in a normal direction when the arc generation detecting section detects an arc generation,
directing the waveform control section to output the first waveform till a predetermined time after detection of the arc generation and for directing the waveform control section to output the second waveform if the predetermined time has passed, wherein
a parameter variable for changing waveforms of the first waveform and the second waveform is set from the robot controller.

2. A robot welding control method for short-circuit-welding by moving a welding torch with a robot including the welding torch at a tip thereof, a robot controller for controlling the robot, a wire feeder for feeding a wire to the welding torch, and a welding electric power source for supplying electric power between the wire and a base material,
the robot welding control method comprising:
a step for feeding the wire and applying a voltage thereto;
a step for judging that the wire comes in contact with the base material;
a step for feeding the wire in a reverse direction;
a step for judging that an arc is generated between the wire and the base material;
a step for supplying an electric power to the wire by a first waveform constituted by plural pulses having a same shape while the wire is fed in a normal direction; and
a step for supplying the electric power by a second waveform having a short-circuit-welding waveform different from the first waveform if a predetermined time has passed after the arc generation, wherein
a parameter variable for changing waveforms of the first waveform and the second waveform is set from the robot controller.

* * * * *

UNITED STATES PATENT AND TRADEMARK OFFICE
CERTIFICATE OF CORRECTION

| | | |
|---|---|---|
| PATENT NO. | : 7,960,672 B2 | Page 1 of 1 |
| APPLICATION NO. | : 11/628738 | |
| DATED | : June 14, 2011 | |
| INVENTOR(S) | : Kiminori Nishimura, Ryuichi Morita and Seigo Nishikawa | |

It is certified that error appears in the above-identified patent and that said Letters Patent is hereby corrected as shown below:

On the Title Page, please correct the Assignee's name Item (73) as follows:

Kabushiki --Kaisha-- Yaskawa Denki

Signed and Sealed this
Tenth Day of April, 2012

David J. Kappos
*Director of the United States Patent and Trademark Office*